Patented Mar. 23, 1954

2,673,139

UNITED STATES PATENT OFFICE 2,673,139

MANUFACTURE OF ALUMINUM FLUORIDE CATALYST

Cyril Woolf, Long Island City, and Charles B. Miller, Lynbrook, N. Y., assignors to Allied Chemical & Dye Corporation, New York, N. Y., a corporation of New York No Drawing. Application August 3, 1951, Serial No. 240,295

7 Claims. (Cl. 23—88)

This invention relates to preparation of catalytic material which is particularly active in promoting reactions in which halogen compounds are reactants and/or products. More specifically, the invention is directed to a method for preparing an aluminum fluoride catalyst which is highly active in altering the halogen content of organic halogen-containing compounds.

Compositions such as antimony fluoride and mixtures thereof with antimony chloride have been proposed for use in promoting e. g. fluorination of aliphatic halides with HF to bring about substitution of halogen other than fluorine by fluorine. Disadvantages, arising by reason of the corrosiveness, liquid (as distinguished from solid) character, and high volatility of antimony halides (leading to product contamination difficulties) inhere in operation with these catalysts. Aluminum chloride and bromide have been proposed for catalyzing disproportionation (redistribution of halogen among the molecules of compounds containing more than one variety of halogen atom) but yields have not been as high as desired and again, the less expensive aluminum chloride is limited with respect to operation at high temperature by the shortcoming of high volatility. For conducting hydrohalogenation (addition of hydrogen halide to a double bond to produce saturation) or dehydrohalogenation (removal of hydrogen halide from adjoining carbon atoms to produce an unsaturated linkage), catalysts such as chromium trifluoride, gaseous free oxygen and activated carbon have been proposed but such processes have encountered the disadvantage of undesirably low conversion or (particularly in the case of the gaseous oxygen catalyst) lack of ease of manipulation and control.

Objects of the present invention include development of a method for preparing a catalytic material which units the advantages of being a solid, effective in promoting reactions involving alteration of the halogen (e. g. fluorine) content of halogen-containing compounds, such as fluorination of halogenated organic compounds with HF, disproportionation, hydrohalogenation and dehydrohalogenation, which is free of the aforementioned disadvantages of a liquid or gaseous catalyst, and produces good yields and conversions of sought-for products.

According to the present invention, a highly active and versatile aluminum fluoride catalyst having the desired indicated properties in altering halogen content of halogen-containing compounds is prepared by treating aluminum halide (other than aluminum fluoride) which is free of water in the liquid phase, with gaseous inorganic fluorinating agent reactive therewith under conditions to bring about reaction between starting materials. Temperature is suitably controlled to avoid appreciable volatilization of solid reactant and formation of liquid phase containing water in the system. As hereinafter more fully explained, this means, for example in the case of anhydrous aluminum halide starting material, maintaing temperature high enough to promote reaction but below temperature at which appreciable volatilization of said halide occurs. In the case of hydrate starting materials it means, for example, maintaining temperatures low enough to avoid fusion but high enough to promote reaction and prevent condensation of water, such as water which may be given up by solid aluminum halide hydrate. Contact between gaseous fluorinating agent and said aluminum halide is maintained for time and in the presence of sufficient agent to permit substantial, preferably complete conversion of said aluminum halide to aluminum fluoride.

Aluminum chloride is the preferred aluminum halide in preparation of our catalysts although others such as the bromide may be utilized. The aluminum halide may be either anhydrous or a hydrate. Hydrates of aluminum halides, which contain various amounts of water of hydration, for example, in the case of aluminum chloride up to six mols per mol of $AlCl_3$, are known. Any of these materials may serve as reactant for catalyst preparation provided formation of appreciable liquid phase does not occur at the temperature of reaction. In order to maintain aluminum chloride in the solid phase at temperatures as high as 100° C. (which, as indicated below, is a preferred low limit of operating temperature), the water content of the hydrate should not be greater than about 6 mols per mol of $AlCl_3$. Accordingly, the latter ratio is a preferred maximum. Since increased water content of the hydrate frequently tends to increase fusibility, when reaction temperatures are higher, tolernce of water content of the hydrate may be correspondingly lower, and water content of the starting material will be maintained at a value such that substantially no fusion takes place at temperatures and other conditions maintained throughout the fluorination reaction. Aluminum chloride hydrates purchased on the market formed by evaporation of an aqueous solution of $AlCl_3$ or by reaction of aluminum hydrate with HCl followed by evaporation to dryness are examples of sources of suitable starting material.

Aluminum chloride hexahydrate prepared by saturating a concentrated aqueous solution of AlCl₃ with HCl to promote crystallization may be employed. The latter material is somewhat less susceptible to fusion at elevated temperatures than are the usual hydrates. The aluminum halide starting material, hydrate or anhydrous, may be in granule or pellet form, or suspended on an inert carrier such as alumina or carbon.

The fluorinating agents indicated are those inorganic materials which react with the aluminum halide other than aluminum fluoride to form aluminum fluoride. To facilitate preventing formation of liquid phase in contact with the aluminum halide, anhydrous or substantially anhydrous fluorinating agent is preferably employed. Gaseous hydrofluoric acid is a particularly suitable fluorinating agent, but boron fluoride ($BF_3$) may also be used.

In instances where aluminum halide is disposed in a bed in a reaction zone and a gas stream comprising fluorinating agent passed through the bed, the chemical reaction between solid and gaseous fluorinating agent initially will usually be concentrated in the upstream portions of the bed and thereafter gradually travel in a downstream direction through the bed. Inasmuch as the reaction is generally exothermic, as in the case of the reaction between $AlCl_3$ and HF, the progress of the reaction may be followed roughly by noting the zone of maximum temperature, i. e. the "hot spot" in the aluminum halide bed by means of suitably arranged thermocouples. The reaction temperatures may be controlled at the levels desired by supplying externally arranged cooling or possibly heating means as needed.

As previously suggested, temperatures are maintained sufficiently high to bring about the reaction between aluminum halide and fluorinating agent, and preferably high enough to effect ultimate complete conversion of the halide to aluminum fluoride. As a further consideration, temperature is maintained high enough to prevent formation of liquid phase containing water at any point in the aluminum halide zone and preferably to prevent formation of any substantial amount of liquid phase in contact with the aluminum halide. A particular embodiment of the invention is directed to maintaining temperature to volatilize and maintain any water present in the system in the gas phase, thereby to produce a substantially anhydrous $AlF_3$ catalyst. When treating an aluminum halide hydrate, temperatures below about 100° C. may be employed while avoiding formation of water in the liquid phase, for example by using reduced total pressure or diluting the fluorinating agent with an inert gas to carry off uncondensed any water vapor formed, or otherwise exercising care to prevent formation of water in the liquid phase in contact with the aluminum halide. However, when treating the hydrates, to facilitate preventing condensation of water and also largely to afford increased rate of reaction, temperatures above about 100° C. consistent with avoidance of fusion throughout the aluminum halide zone are preferred. When using anhydrous aluminum halide and anhydrous fluorinating agent as starting materials, since presence of water in the liquid phase is not a problem, the low limit of temperature is set principally by desired rate of reaction and avoidance of presence of appreciable amounts of liquid phase fluorinating agent. For anhydrous aluminum chloride preferred temperature is not less than about 80° C. at the point of maximum temperature (hot spot) of the reaction zone. However, even when using hydrofluoric acid as fluorinating agent, temperatures below 20° C. may be employed, if desired, while maintaining reduced pressure or reduced partial pressure of fluorinating agent by mixing the same with an inert dry carrying gas, thereby to avoid presence of liquid phase.

Temperature throughout the aluminum halide zone is maintained below levels at which the aluminum halide melts and below levels at which said halide vaporizes to an appreciable degree. In the case of the hydrate, as previously indicated, the maximum temperature may be determined largely by the water content of the solid. Generally, if the aluminum halide hydrate is not of excessive water content, preferred temperatures to be maintained throughout the aluminum halide zone are in the range of 100 to 170° C. consistent with avoidance of fusion. When treating anhydrous aluminum chloride, due to the tendency of this material to sublime, maximum temperature is limited by the desirability of avoiding substantial vaporization of the solid. Accordingly, preferred maximum temperature for fluorinating anhydrous aluminum chloride is about 125° C.

An advantage of this catalyst preparation method is that the entire procedure may be and normally is carried out at atmospheric pressure. However, super-atmospheric or sub-atmospheric pressures may be utilized if desired for fluorinating aluminum halides, although no particular advantage will ordinarily be obtained thereby. Reaction between fluorinating agent and aluminum halide at the outset of the operation may be found to be quite intense, sometimes causing the development of an excessive amount of heat. In these cases, it is usually preferred to reduce the partial pressure of fluorinating agent in the gas stream (and simultaneously the reaction intensity) by diluting the fluorinating agent with a suitable inert gas such as nitrogen. During the latter portion of the treatment of aluminum halide when reaction tends to be less intense, use of inert gas may be discontinued and substantially pure fluorinating agent, e. g. gaseous hydrofluoric acid, employed.

Contact between fluorinating agent and aluminum halide is maintained for time sufficient to bring about reaction to form aluminum fluoride catalyst having the above-described sought-for properties. Preferably the time of contact and amount of fluorinating agent employed are such that substantial, preferably complete, fluorination of aluminum halide to aluminum fluoride catalyst is obtained. Generally, in the lower portions of the temperature ranges indicated above, reaction rate will be noticeably slower and consequently longer times of contact between fluorinating agent and aluminum halide may be desired. Below about 80° C. particular attention may advantageously be given to time of contact in order to assure that complete fluorination is effected.

Catalyst synthesis reaction is believed to proceed as follows:

$$3HF + AlX_3 = AlF_3 + 3HX$$

HF displaces HX (X representing halogen) causing transformation of $AlX_3$ into $AlF_3$. The remaining aluminum fluoride may be used as such in reactions involving alteration of the halogen content of organic halogen-containing compounds, but is preferably activated by heating in a gaseous atmosphere at elevated temperature, i. e. temperature at which activation takes place (presumably accompanied by vaporization and removal of any amounts of water of hydration). The finished catalyst is then recovered. It has been found that heating the $AlF_3$ in a stream of dry nitrogen or HF gas for about one to four hours at temperatures of about 300–350° C. or four to six hours at 250–300° C. is ordinarily suitable for this purpose. If desired, the catalyst may be activated by heating the $AlF_3$ in a stream of free oxygen-containing gas such as oxygen or air at about 400–600° C. for approximately 30 minutes to six and one-half hours (depending mostly upon the $O_2$ content of the treatment gas), in which case activation with dry nitrogen or HF gas as aforesaid, may be omitted. Catalyst so activated with free oxygen gas has particular enhanced activity for fluorination of organic halogenated compounds.

In the science and technique of catalyst preparation, the size and other physical properties, e. g. resistance to crushing, of the pellets or granules of the catalyst is recognized as being of substantial importance. According to the method of the present invention aluminum halide which undergoes fluorination does not appreciably change in granule size, distribution or structural strength. Hence, the aluminum fluoride catalyst granules advantageously have substantially the same salutary or improved properties (for example mesh size distribution of the particles and crushing resistance) as the original halide starting material.

The aluminum fluoride catalysts produced according to the method of the present invention, although composed of lumps or other discrete particles of substantial size, when examined even by the highest powered optical microscopes, appear to be of non-crystalline or "amorphous" structure. When these "amorphous" aluminum fluorides are examined using X-ray diffraction technique, extremely small sub-microscopic crystals, "crystallites" may be detected, which have radius not substantially greater than about 500 Angstrom units, preferably not substantially greater than about 200 Å. radius. Such aluminum fluorides having "crystallite" size not substantially greater than about 500 Å. radius (preferably 200 Å. or less) are the materials which have been found to possess to maximum extent the effective and versatile catalytic properties sought for in the method of the present invention. These catalysts are effective generally in promoting reactions involving alteration of the halogen (e. g. fluorine) content of organic halogenated compounds. The fluorination, disproportionation, hydrohalogenation and dehydrohalogenation types of reactants indicated above are but examples of the capability of the aluminum fluoride catalysts prepared according to the method of the present invention. The indicated types of processes, rather than limiting the uses of our catalyst, illustrate its general applicability to reactions involving alteration of the halogen content of organic compounds.

This behavior is in marked contrast to the majority of aluminum fluorides, from a multiplicity of sources known in the prior art, consisting of lumps or smaller discrete particles, which lumps or particles in turn are composed of $AlF_3$ crystals of relatively large size, i. e. not less than 1000 and usually several thousand Angstrom units radius and above, as in the case of commercial types of aluminum fluorides available on the market. The latter macro-crystalline aluminum fluorides are not as effective in promoting reactions, particularly under mild conditions, e. g. fluorinating with HF at 100–300° C., as are the "amorphous" aluminum fluorides, and hence when the catalyst is to be subsequently used under such mild conditions catalyst preparation conditions which cause formation of only macro-crystalline $AlF_3$ are avoided.

Although the process may be carried out batchwise with respect to fluorinating agent, it is preferred to maintain the aluminum halide in a reaction zone, introduce a gaseous stream comprising fluorinating agent into the zone wherein fluorination reaction takes place and withdraw products and unreacted gaseous material from the exit of the zone. In such procedures the time of contact between halide and fluorinating agent and the amount of fluorinating agent employed are such that the sought-for degree of fluorination of aluminum halide is realized.

The reaction tube and other equipment in contact with reactants in which the process of this invention is carried out are preferably constructed of inert material, that is, having no catalytic properties. Graphite, nickel and Inconel are suitable since they are resistant to corrosive substances such as hydrofluoric acid.

The following examples illustrate the procedure of the present invention, the parts and percentages being by weight unless otherwise indicated.

*Example 1*

139 parts of 6 to 20 mesh anhydrous aluminum chloride of commercial grade were charged to a ¾" I. D. tubular nickel reactor provided with inlet and outlet connections for a gas stream and means for externally cooling the reactor by blasts of air. An auxiliary externally disposed electrical resistance heater was also supplied to furnish heat to the reactor when needed. Gaseous anhydrous HF, initially at the rate of 10 to 15 parts per hour and mixed about equal parts by volume of nitrogen to act primarily as a heat dissipating medium, was passed through the reactor while maintaining maximum internal temperature in the reactor not above 85° C. Means were provided for sampling the reactor effluent gas to determine the presence of HF and/or HCl. Initially, the point of maximum reaction temperature was near the upstream end of the bed of solid aluminum chloride. After about 5 hours of treatment with hydrofluoric acid, the point of maximum temperature had reached substantially the end of the reacting aluminum chloride mass and unreacted hydrogen fluoride began to appear in the reactor effluent stream. During the latter 5 hour treatment period, as reaction intensity gradually decreased, the percentage of nitrogen in the gas stream was also decreased. The temperature of the reactor was thereupon slowly raised to 300° C. While continuing passage of a slow HF stream (in the absence of the nitrogen) through the tube for an additional period of 2 hours. At this point, the reactor effluent gas contained only HF and was substantially free of HCl. 88 parts of aluminum fluoride, containing 98% $AlF_3$ and less than 0.15% chlorine, in hard granular form and having substantially the same mesh size as the aluminum chloride, were obtained. An X-ray diffraction pattern of aluminum fluoride catalyst prepared according to the latter procedure was made which indicated crystallite size to be in the range of 100–200 Angstrom units radius the average being 140 Å, i. e. the crystallite size was so small as to be indicative of "amorphous" structure.

80 parts of catalyst prepared as in Example 1 were charged to a ½" I. D. tubular reactor which was thereafter maintained at 250° C. A gaseous mixture of carbon tetrachloride at the rate of about 154 parts per hour and anhydrous HF at the rate of about 26 parts per hour were passed over the catalyst. 95% of the HF reacted, the product having the following molar percentage composition: $CCl_3F$, 24.7%; $CCl_2F_2$, 34.8%; $CClF_3$, 40.5%.

Through the same bed of $AlF_3$ catalyst, maintained at 420° C., there was passed a gaseous stream containing about 100 parts per hour of $CCl_2CClF_2$ and 5 parts per hour HF. 90% of the HF reacted to form mainly an isomeric mixture of $C_2Cl_3F_3$ plus some $C_2Cl_2F_4$ isomers.

50 parts of $AlF_3$ catalyst prepared from solid anhydrous $AlCl_3$ and gaseous HF by the procedure outlined above were mounted in a reaction tube and maintained at 280° C. During an operating period of 80 minutes 85 parts of gaseous $CH_3CHF_2$ were passed through the tube. Dehydrofluorination products included 13 parts HF, 29 parts $CH_2=CHF$ and 40 parts unreacted $CH_3CHF_2$.

80 parts $AlF_3$ catalyst, also prepared from solid anhydrous $AlCl_3$ and gaseous HF by the above procedure were mounted in a reaction tube and maintained at 150° C. $CCl_3F$ at the rate of 206 parts per hour was passed over the catalyst at this temperature, gaseous products were withdrawn from the reactor, and $CCl_4$ removed by cooling and condensation. The fluorine-containing product had the following molar composition, $CClF_3$, 19.8%; $CCl_2F_2$, 48.6%; $CCl_3F$, 31.6%.

Example 2

A 25% by weight aqueous solution of $AlCl_3$ was evaporated to dryness in a basin of monel metal by first heating to 127° C. over a gas flame until a viscous liquid was obtained and finally at 150° C. in a hot air oven until a hard mass of aluminum chloride hydrate was formed. The product was crushed and sieved. 50 parts of this product, 4 to 14 mesh, were charged to a ½" I. D. nickel tubular reactor arranged as described in Example 1 and a stream of gaseous HF (diluted with nitrogen in progressively diminishing amount, as Example 1) was passed through the reactor while maintaining maximum temperature at about 150° C. until the evolution of water and HCl had ceased and the reactor gaseous effluent containing substantially only HF. Desired aluminum fluoride catalyst was obtained.

A gas stream comprising about 154 parts per hour of carbon tetrachloride and 25 parts per hour of HF were then passed through the above described tube and over the aluminum fluoride catalyst prepared, while maintaining the tube temperature at 300° C. to initiate reaction and remove excess water from the catalyst. The temperature was then reduced to 200° C. 98% of the HF reacted, the product having the molar composition as follows: $CCl_3F$, 31%; $CCl_2F_2$, 61%; $CClF_3$, 8%.

Example 3

50 parts of "Darco" activated carbon 4 to 12 mesh size, were placed in a tubular nickel reactor having ½" I. D. arranged as described in Example 1 and a stream of HF was passed through the tube while maintaining tube temperature below 100° C. for 2 hours. Thereafter the tube temperature was gradually raised to 300° C. while continuing the flow of HF. In this manner, all the silica was removed from the activated carbon. The carbon was thereafter cooled, removed from the nickel tube and mixed with a solution of 10 parts of $AlCl_3$ in 200 parts of ethyl chloride. The ethyl chloride solvent was then evaporated and the $AlCl_3$-impregnated carbon was replaced in the reactor and treated therein with a stream of gaseous HF as in Examples 1 and 2 at temperature of about 25° for 1 hour. At the end of this time, there was substantially no HCl issuing in the reactor effluent gas.

Into the reactor containing the aluminum fluoride catalyst produced, there was then introduced a mixture of about 24 parts per hour of HF and 154 parts per hour of $CCl_4$ while maintaining the tube at 300° C. Conversion of HF was 98%. The only products were $CCl_2F_2$ and $CCl_3F$, which were formed in molar ratio of $CCl_2F_2/CCl_3F=1.4$

Example 4

$AlCl_3$, as a 25 weight percent aqueous solution, was mixed with an equal weight (on the basis of $AlCl_3$) of "Alorco Grade F-1" 4 to 8 mesh activated alumina and the mixture evaporated to dryness at 130° C. The product, which was in the form of a cake, was broken down to 4 to 8 mesh size, charged to a ¾" I. D. nickel tubular reactor arranged as described in Example 1 and a stream of gaseous HF (diluted with nitrogen in progressively diminishing amount, as in Example 1) was passed through the tube while maintaining maximum temperature at about 150° C. until evolution of HCl and water had ceased.

The temperature of the reactor containing the aluminum fluoride catalyst so produced, was raised to 300° C. while passing through the tube a gaseous mixture of HF and $CCl_4$ in molar ratio of $HF/CCl_4=1.3$ and contact time of 2.3 seconds. After 1 hour, during which time activation of the catalyst occurred, the reaction temperature was reduced to 230° C., at which temperature conversion of HF was found to be 98%. The sole products of reaction were $CCl_3F$, $CCl_2F_2$ and $CClF_3$ which were formed, respectively, in molar ratio 1:3.3:0.20.

The foregoing examples are merely illustrative and do not limit the range of temperatures which may be employed for preparation of aluminum fluoride catalyst, or during use to promote fluorinating or other reactions effected for example at temperatures of 500° C., 600° C., or higher.

The hereindescribed method for oxygen-heat treatment of catalysts to enhance activity thereof for certain purposes constitutes the claimed subject matter of Calfee and Miller application Serial No. 240,290, filed August 3, 1951.

We claim:

1. The process of producing an aluminum fluoride catalyst which comprises maintaining a zone containing anhydrous aluminum chloride, introducing into said zone a substantially anhydrous gaseous stream comprising fluorinating agent of the group consisting of hydrogen fluoride and boron fluoride, and contacting said stream with said aluminum chloride, maintaining effective reaction temperature in said zone at a maximum in the approximate range 80 to 125° C., and continuing introduction of said gas stream and contact thereof with said aluminum chloride for time sufficient and in the presence of sufficient gaseous fluorinating agent to convert a substantial proportion of said aluminum chloride to aluminum fluoride and to form a catalyst having crystallite size not substantially greater than about 500 Angstrom units radius.

2. The process of claim 1 in which the fluorinating agent is gaseous substantially anhydrous hydrofluoric acid.

3. The process of producing an aluminum fluoride catalyst which comprises maintaining a zone containing solid hydrate of aluminum chloride substantially free of water in liquid phase, introducing into said zone a gaseous stream comprising hydrofluoric acid and contacting said stream with said hydrate of aluminum chloride, maintaining temperature in said zone in the approximate range 100 to 170° C. but low enough to prevent appreciable fusion of said hydrate and high enough to prevent formation of liquid phase water in said zone, and continuing introduction of said gas stream and contact thereof with said hydrate for time sufficient and in the presence of sufficient gaseous hydrofluoric acid to convert substantially all of said hydrate of aluminum chloride to aluminum fluoride and to form a catalyst having crystallite size not substantially greater than about 500 Angstrom units radius.

4. The process of producing an aluminum fluoride catalyst which comprises introducing into a reaction zone solid hydrate of aluminum chloride substantially free of water in the liquid phase, introducing into said zone a gaseous stream comprising hydrofluoric acid and contacting said stream with said aluminum chloride, maintaining temperature in said zone high enough to promote substantial reaction between said acid and said chloride and to prevent formation of liquid phase containing water in said zone but maintaining said temperature low enough to prevent appreciable fusion of said halide, and continuing introduction of said gas stream and contact thereof with said aluminum fluoride for a time sufficient and in the presence of sufficient gaseous hydrofluoric acid to convert a substantial proportion of said aluminum chloride to aluminum fluoride and to form a catalyst having crystallite size not substantially greater than about 500 Angstrom units radius.

5. The process of producing an aluminum fluoride catalyst which comprises introducing into a reaction zone substantially anhydrous aluminum chloride, introducing into said zone a substantially anhydrous gaseous stream comprising hydrofluoric acid and contacting said stream with said aluminum chloride, maintaining temperature in said zone high enough to promote substantial reaction between said acid and said chloride and to prevent formation of liquid phase in said zone but maintaining said temperature low enough to prevent appreciable volatilization of said chloride, and continuing introduction of said gas stream and contact thereof with said aluminum chloride for a time sufficient and in the presence of sufficient gaseous hydrofluoric acid to convert a substantial proportion of said aluminum chloride to aluminum fluoride and to form a catalyst having crystallite size not substantially greater than about 500 Angstrom units radius.

6. The process of producing an aluminum fluoride catalyst which comprises introducing into a reaction zone solid aluminum chloride substantially free of water in the liquid phase, introducing into said zone a gaseous stream comprising a fluorinating agent of the group consisting of hydrogen fluoride and boron fluoride and contacting said stream with said aluminum chloride, maintaining temperature in said zone high enough to promote substantial reaction between said fluorinating agent and said chloride and to prevent formation of liquid phase containing water in said zone but maintaining said temperature low enough to prevent appreciable fusion of said chloride and appreciable volatilization of said chloride, and continuing introduction of said gas stream and contact thereof with said aluminum chloride for a time sufficient and in the presence of sufficient gaseous fluorinating agent to convert a substantial proportion of said aluminum chloride to aluminum fluoride and to form a catalyst having crystallite size not substantially greater than about 500 Angstrom units radius.

7. The process of claim 6 in which temperature is not in excess of 170° C.

CYRIL WOOLF.
CHARLES B. MILLER.

References Cited in the file of this patent
UNITED STATES PATENTS

| Number | Name | Date |
|---|---|---|
| 1,563,536 | Specketer | Dec. 1, 1925 |
| 1,851,475 | Zimmerman | Mar. 29, 1932 |
| 1,937,885 | Gitzen et al. | Dec. 5, 1933 |
| 2,020,431 | Asborne et al. | Nov. 12, 1935 |

OTHER REFERENCES

J. W. Mellor's "A Comprehensive Treatise on Inorganic and Theoretical Chemistry," vol. 6, page 938, Longmans, Green and Co., N. Y.

Hackh's "Chemical Dictionary," page 264, 2nd edition, P. Blakiston's Son and Co., Philadelphia.

Smith's "Inorganic Chemistry," 3rd ed., page 811, Century Co., N. Y.